US009454017B2

(12) United States Patent
Chen (10) Patent No.: US 9,454,017 B2
(45) Date of Patent: Sep. 27, 2016

(54) GLASSES

(71) Applicant: Lin-Yun Chen, Tainan (TW)

(72) Inventor: Lin-Yun Chen, Tainan (TW)

( * ) Notice: Subject to any disclaimer, the term of this patent is extended or adjusted under 35 U.S.C. 154(b) by 0 days.

(21) Appl. No.: 14/523,973

(22) Filed: Oct. 27, 2014

(65) Prior Publication Data
US 2016/0116760 A1    Apr. 28, 2016

(51) Int. Cl.
| | | |
|---|---|---|
| G02C 5/14 | (2006.01) | |
| G02C 5/22 | (2006.01) | |
| G02C 5/20 | (2006.01) | |
| G02C 9/04 | (2006.01) | |

(52) U.S. Cl.
CPC ............... *G02C 5/146* (2013.01); *G02C 5/20* (2013.01); *G02C 5/22* (2013.01); *G02C 9/04* (2013.01); *G02C 2200/02* (2013.01); *G02C 2200/04* (2013.01); *G02C 2200/06* (2013.01); *G02C 2200/08* (2013.01)

(58) Field of Classification Search
CPC .................. G02B 2027/0178; G02B 27/0176; G02B 27/0149; G02C 2200/08; G02C 2200/02; G02C 5/146; G02C 1/10; G02C 3/003; G02C 7/16; G02C 3/006; G02C 2200/06; G02C 5/22; G02C 9/04; G02C 5/20
USPC ........ 351/109, 116, 158, 178, 111, 115, 133, 351/140, 41, 59, 86, 47, 63, 57, 138, 80
See application file for complete search history.

(56) References Cited

U.S. PATENT DOCUMENTS

| | | | | |
|---|---|---|---|---|
| 2009/0135370 A1* | 5/2009 | Xiao | ......................... | G02C 1/08 351/140 |
| 2010/0066974 A1* | 3/2010 | Croft | ........................ | G02C 7/14 351/159.65 |
| 2010/0083426 A1* | 4/2010 | Chiang | ................ | A63B 33/002 2/428 |
| 2012/0019770 A1* | 1/2012 | Dichiara | .................. | G02C 1/02 351/106 |
| 2013/0321757 A1* | 12/2013 | Chen | ........................ | G02C 1/04 351/47 |

\* cited by examiner

*Primary Examiner* — Scott J Sugarman
*Assistant Examiner* — Daniele Manikeu
(74) *Attorney, Agent, or Firm* — Alan D. Kamrath; Kamrath IP Lawfirm, P.A.

(57) ABSTRACT

A pair of glasses includes a frame, a lens unit, two temples, and two snap-fit members. The frame includes a lens-holding portion and two connecting seats each having a bump and a projection, and an engagement space is defined between the bump and the projection. The lens unit supported by the lens-holding portion has two through-holes in which the bumps are held. Each snap-fit member relative to the frame is rotatable between a fixed position and a separated position. Each snap-fit member has a resisting portion formed in an internal face thereof, and the resisting portion is held in the engagement space to causes the lens unit to be fixed when each snap-fit member stays in the fixed position. The resisting portion keeps away from the engagement space to make the lens unit not fixed when each snap-fit member stays in the separated position.

6 Claims, 10 Drawing Sheets

GLASSES

BACKGROUND OF THE INVENTION

1. Field of the Invention

The present invention relates to a pair of glasses with a structure for installation of lenses and, more particularly, to a pair of glasses contributing to replacement of lenses.

2. Description of the Related Art

In general, a pair of glasses includes a frame, two lenses, and two temples pivotally fitted at both sides of the frame, with the lenses held in two grooves formed in internal faces of the frame's rims. Each of the lenses to be installed may be constrainedly placed into the groove according to the frame's elasticity. In this regard, either one lens being installed (removed) or the frame, however, may be damaged because of friability of the lens.

In conventional techniques, there have been several glasses structures developed for flexible removal/installation of replaceable lenses without damage of a lens and/or a frame. However, a pair of glasses on which conventionally replaceable lenses are installed has a complex structure negatively affecting appearance of the pair of glasses.

BRIEF SUMMARY OF THE INVENTION

Thus, an objective of the present invention is to provide a pair of glasses which features lenses removed and secured conveniently, simplified structure and extended service life.

To achieve this and other objectives, a pair of glasses of the present invention includes a frame, a lens unit, two temples, and two snap-fit members. The frame includes first and second ends spaced in a longitudinal direction thereof and at least one lens-holding portion between the first and second ends. A connecting seat is formed at each of the first and second ends of the frame and includes internal and external ends spaced in the longitudinal direction. The connecting seat further includes an exterior surface formed with a bump and a projection. The bump is adjacent to the internal end of the connecting seat, and the projection is formed on the external end of the connecting seat and spaced from the bump, defining an engagement space between the bump and the projection. The lens unit is supported by the lens-holding portion and includes two through-holes in which the bumps of the two connecting seats are held. Each temple is connected with the external end of one of the connecting seats of the frame. Each snap-fit member includes spaced first and second ends. A pivotal portion is provided on the second end of each snap-fit member and pivotally engaged with a corresponding connecting seat of the frame. Each snap-fit member is rotatable relative to the frame between a fixed position and a separated position. A resisting portion is formed on an internal face of each snap-fit member. The resisting portion is held in the engagement space to fix the lens unit in position when each snap-fit member is in the fixed position. The resisting portion keeps away from the engagement space to not fix the lens unit when each snap-fit member is in the separated position.

In a preferred form, a first magnet is received in the bump, and a second magnet is provided in the first end of each snap-fit member. The resisting portion of each snap-fit member is located between the second magnet and the pivotal portion. The second magnet and a corresponding first magnet attract each other to fix the lens unit when each snap-fit member is in the fixed position, and the second magnet keeps away from the corresponding first magnet when each snap-fit member is in the separated position.

In a preferred form, the lens unit includes two lenses, and each lens includes an external side engaged with an associated connecting seat. Each through-hole of the lens unit is formed in the external side of one of the lenses, and the external side of each lens is located inside the engagement space and spaced from the projection of the associated connecting seat. The resisting portion of each snap-fit member resists the external side of one of the lenses when each snap-fit member is in the fixed position.

In a preferred form, the lens unit includes a frame body and a lens mounted in the frame body. The frame body includes two external sides engaged with the two connecting seats respectively. Each through-hole of the lens unit is formed in one of the external sides of the frame body, and each external side of the frame body is located inside the engagement space and spaced from the projection of an associated connecting seat. The resisting portion of each snap-fit member resists one of the external sides of the frame body when each snap-fit member is in the fixed position.

In another preferred form, the lens unit includes a lens having two external sides engaged with the two connecting seats respectively. Each through-hole of the lens unit is formed in one of the external sides of the lens, and each external side of the lens is located inside the engagement space and spaced from the projection of an associated connecting seat. The resisting portion of each snap-fit member resists one of the external sides of the lens when each snap-fit member is in the fixed position.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

A pair of glasses according to the preferred teachings of the present invention is shown in FIGS. 1 through 5 of the drawings and generally designated 10. In this embodiment, the glasses 10 includes a frame 12, a lens unit 14, two temples (first and second temples) 16, and two snap-fit members (first and second snap-fit members) 18. The glasses 10 can be used as sunglasses, protective glasses, sports glasses, glasses for correcting myopia, glasses for correcting hyperopia, reading glasses, and so on. The front frame 12 can be made of a suitable material, for example, metal, alloy, or plastic. The temples 16 and the snap-fit members 18 can be made of plastic, rubber, or metal. Furthermore, the temples 16 can be manufactured as the form of a belt.

The frame 12 includes first and second ends 20 and 22 spaced in a longitudinal direction thereof. The frame 12 further includes at least one lens-holding portion 24 between the first and second ends 20 and 22. In this embodiment, the frame 12 includes two lens-holding portions 24, and each lens-holding portion 24 has a lens-holding groove 26 by which the lens unit 14 can be assembled. A connecting seat 28 is formed at a lower portion of each of the first and second ends 20 and 22 of the frame 12 and includes internal and external ends 30 and 32 spaced in the longitudinal direction (see FIG. 4). Two engaging lugs 34 are formed on the external end 32 of each connecting seat 28 and respectively provided with a pin hole 36 through which a pin 38 penetrates. Each of the connecting seats 28 further includes an exterior surface 40 and an interior surface 42. The interior surface 42 is opposite to the face of a glasses user who wears the glasses 10. The exterior surface 40 of each connecting seat 28 is formed with a bump 44 and a projection 46. The bump 44 is adjacent to the internal end 30 of the connecting seat 28, and the projection 46 is formed on the external end 32 of the connecting seat 28 and spaced from the bump 44, so that an engagement space 48 is defined between the bump 44 and the projection 46. In this embodiment, the bump 44 internally develops a recess 50 in which a first magnet 52 is held.

In this embodiment, the lens unit 14 includes two lenses 54, each of which is received in one of the lens-holding grooves 26 and supported by one of the two lens-holding portions 24. Each of the lenses 54 includes an upper portion 56 and an external side 58 engaged with a corresponding connecting seat 28. The lens unit 14 further includes two through-holes 60. In this embodiment, each through-hole 60 is formed in the external side 58 of the upper portion 56 of one of the lenses 54. When each of the lenses 54 is installed on a corresponding lens-holding portion 24 of the frame 12, the through-hole 60 of each of the lenses 54 receives the bump 44 of the corresponding connecting seat 28 (see FIG. 4), and the external side 58 of the upper portion 56 of the lens 54 is located inside the engagement space 48 and opposite to and spaced from the projection 46 of the corresponding connecting seat 28 (see FIG. 3). As such, a spacing (S) from the edge of the external side 58 to the through-hole 60 in the longitudinal direction is less than a width (W) of the engagement space 48 in the longitudinal direction (see FIG. 5).

Each temple 16 includes front and rear ends 62 and 64 spaced in a length direction thereof. The front end 62 of each temple 16 is detachably connected with the frame 12, and the rear end 64 of each temple 16 is adapted to be worn on a user's ear. A slot 66 is formed in the front end 62 of each temple 16, and the engaging lugs 34 of a corresponding connecting seat 28 of the frame 12 is held in the slot 66. The pin 38 penetrating the slot 66 and the engaging lugs 34 for combination of one of the temples 16 and the frame 12 allows each temple 16 to be rotated relative to the frame 12 between an open position and a close position about an axis defined by the pin 38.

The snap-fit members 18 are used to fix the lens unit 14 on the frame 12. In this embodiment, each of the snap-fit members 18 is elongated and includes spaced first and second ends 68 and 70. A pivotal portion 72 is provided on an internal face of the second end 70 and pivotally engaged with a corresponding connecting seat 28 of the frame 12, so that each snap-fit member 18 is rotatable relative to the frame 12 between a fixed position and a separated position. In this embodiment, each of the snap-fit members 18 is pivotally engaged with the engaging lugs 34 of an associated connecting seat 28 by the pin 38. In a practicable embodiment, each of the snap-fit members 18 and a corresponding temple 16, however, depend on two different pins to be pivotally engaged with the frame 12. Moreover, each of the snap-fit members 18 further includes a raised resisting portion 74 in the internal face thereof. Each lens 54 can be positioned by one of the resisting portions 74, which is inserted into the engagement space 48 and resists the external side 58 of the lens 54 (see FIG. 4), when each of the snap-fit members 18 is shifted relative to the frame 12 to the fixed position. Each lens 54 will not be positioned by an associated resisting portion 74, which keeps away from the engagement space 48 (see FIG. 5), when each of the snap-fit members 18 relative to the frame 12 is shifted to the separated position.

Each of the snap-fit members 18 has an accommodation portion 76 in the internal face of the first end 68 thereof for a second magnet 78 held in the accommodation portion 76. The resisting portion 74 is located between the second magnet 78 and the pivotal portion 72 in a length direction of the snap-fit member 18. The second magnet 78 and a corresponding first magnet 52, which attract each other, are able to further fix the lens unit 14 in position when each of the snap-fit members 18 is shifted to the fixed position (see FIG. 4). On the other hand, the second magnet 78 and the corresponding first magnet 52, which are spaced from each other, do not fix the lens unit 14 when each of the snap-fit members 18 relative to the frame 12 is shifted to the separated position (see FIG. 5).

Figure 1:
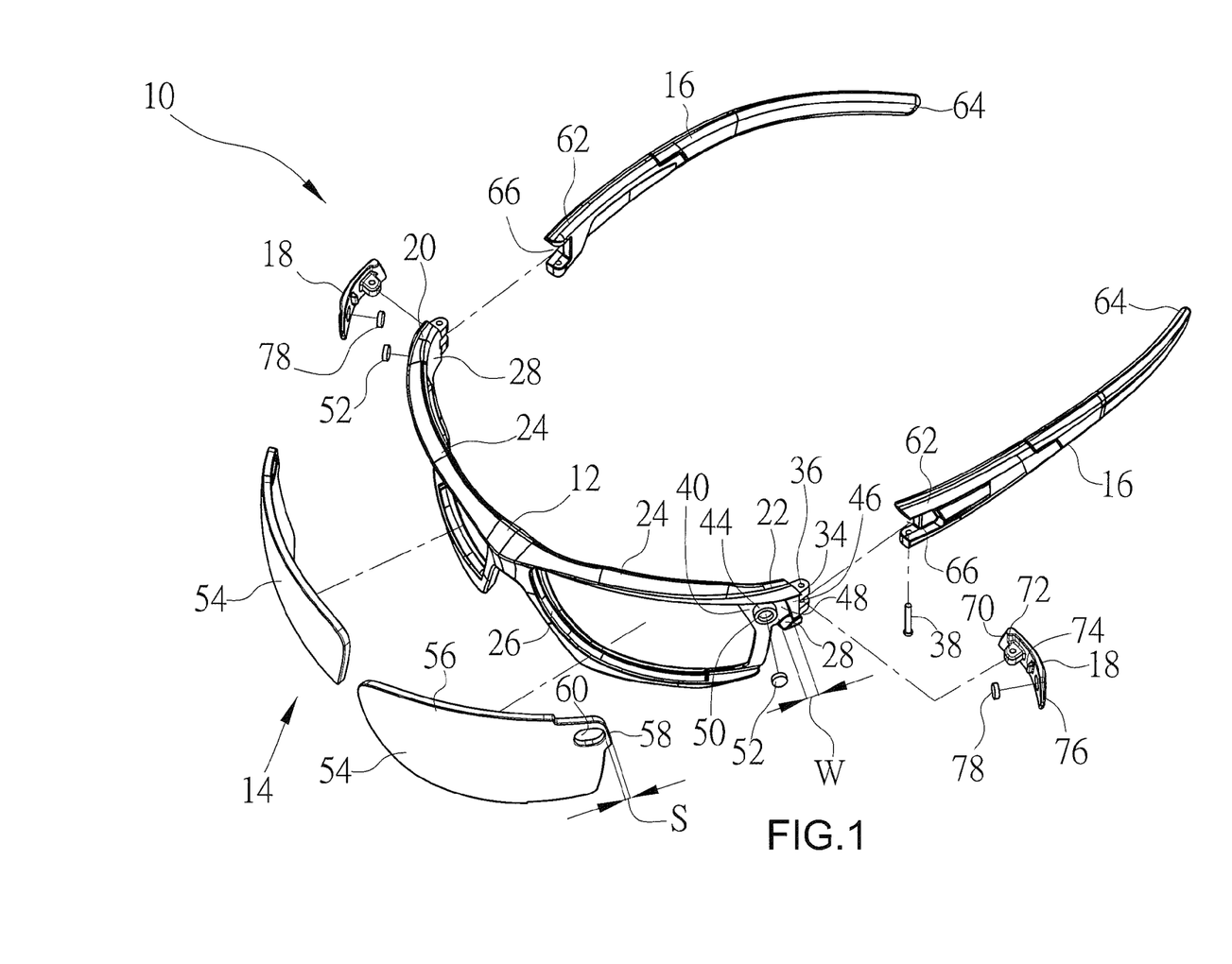
FIG. 1 is an exploded view of a pair of glasses in accordance with a first embodiment of the present invention.
Figure 2:
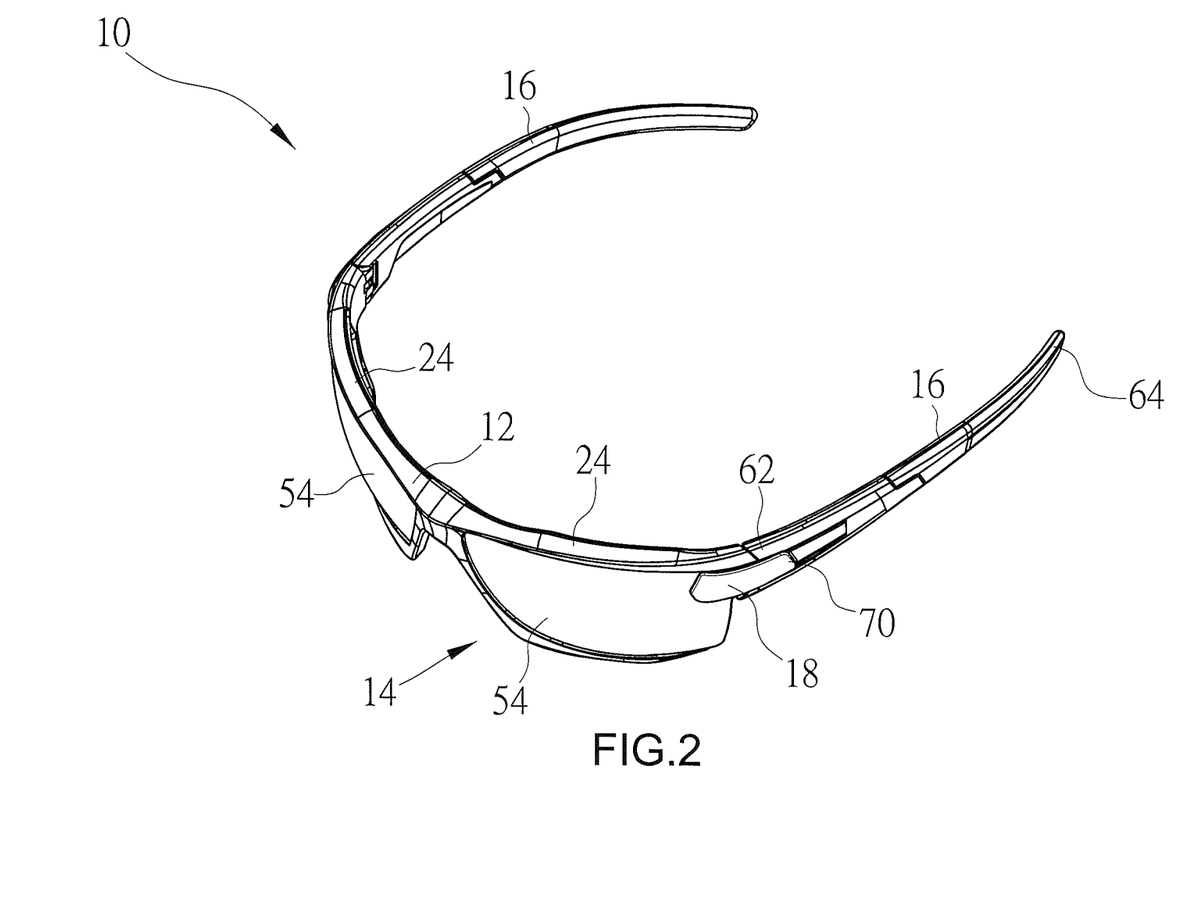
FIG. 2 is a perspective view of the pair of glasses of FIG. 1.
Figure 3:
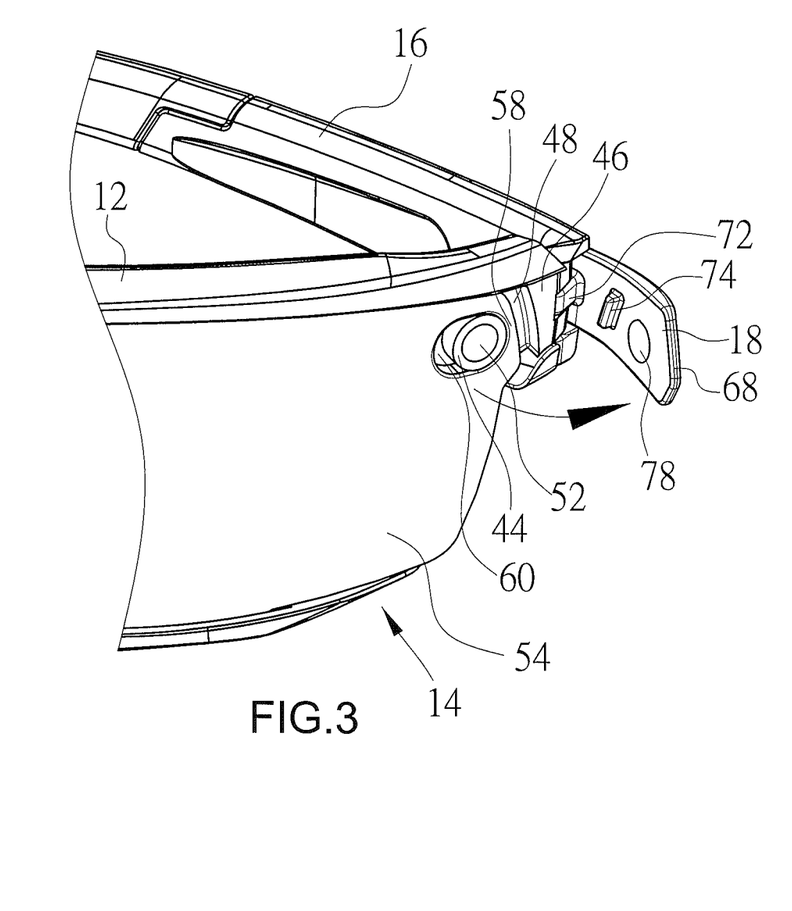
FIG. 3 is a partial schematic view of the pair of glasses of FIG. 2 with a snap-fit member rotated outward and opened.
Figure 4:
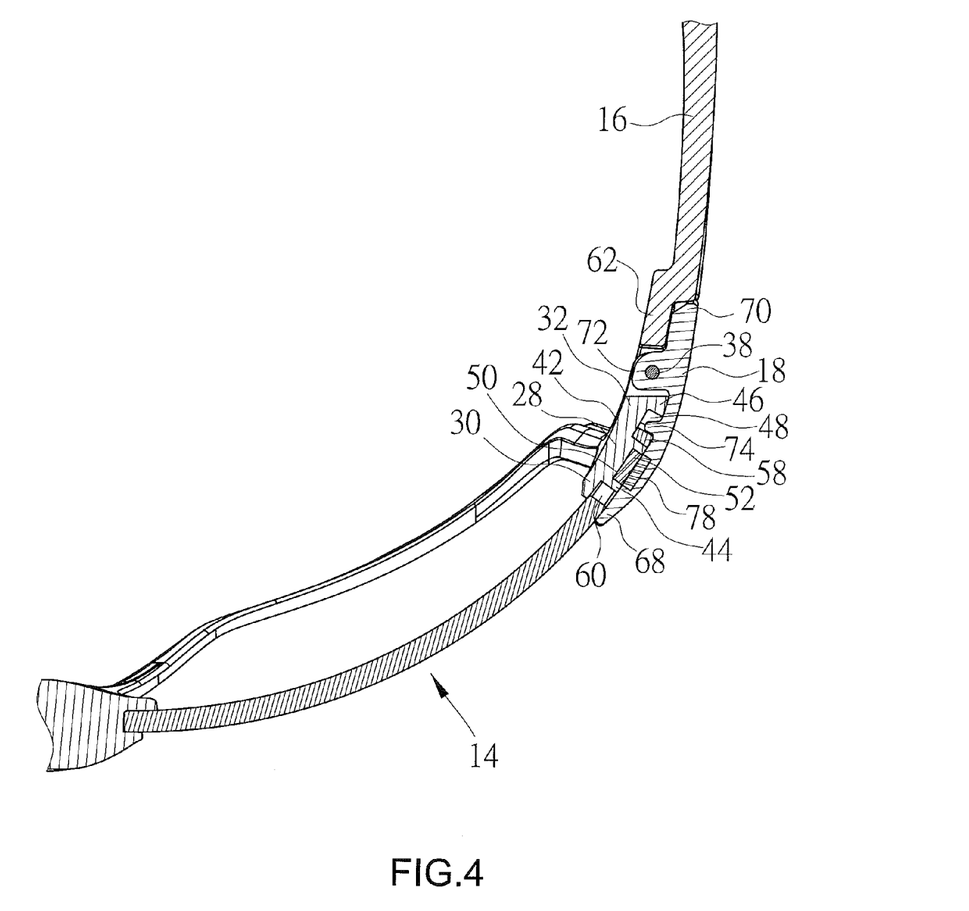
FIG. 4 is a partial, sectional view of the pair of glasses of FIG. 2.
Figure 5:
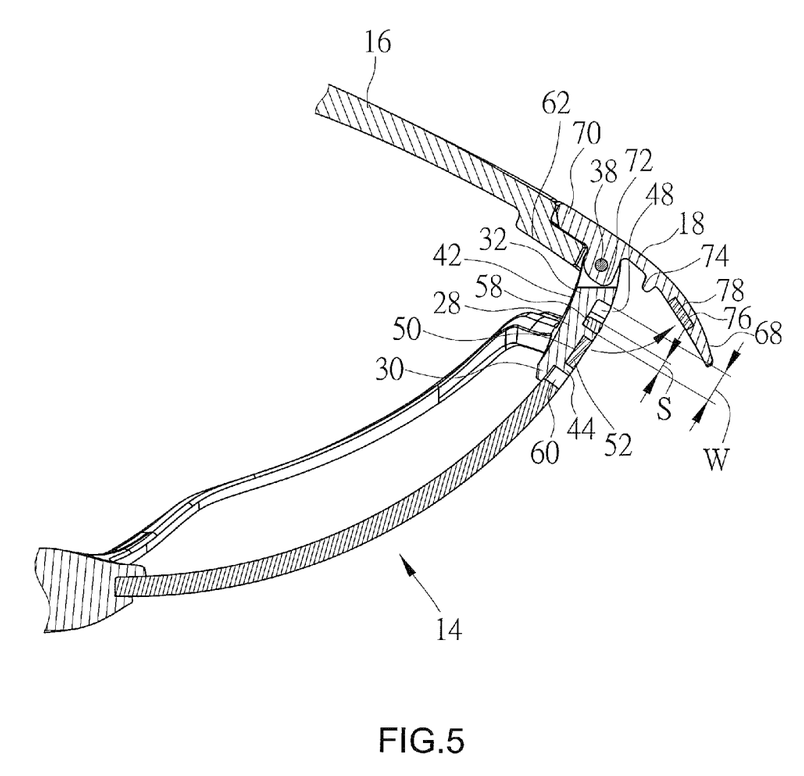
FIG. 5 is a sectional view similar to FIG. 4, illustrating a snap-fit member and a temple rotated outward.

In the present invention, the pair of glasses 10 contributes to the lenses 54 being easily disassembled or assembled. Specifically, each lens 54 can be easily removed when the snap-fit member 18 (which is rotated with the temple 16 simultaneously) is shifted to the separated position as shown in FIG. 5 from the fixed position as shown in FIG. 4, with the resisting portion 74 not held in the engagement space 48 and with the second magnet 78 spaced from the first magnet 52. On the other hand, each lens 54 can be correctly positioned when the snap-fit member 18 is shifted to the fixed position (FIG. 4) from the separated position (FIG. 5), wherein the resisting portion 74 resist the lens 54 and both the first magnet 52 and the second magnet 78 attract each other. Therefore, the lens 54 to be assembled or disassembled needs not to be tightly held in the lens-holding groove 26 of the frame 12 and keeps intact. Thus, the pair of glasses 10 of the present invention features lenses removed and secured conveniently and simplified structure.

Figure 6:
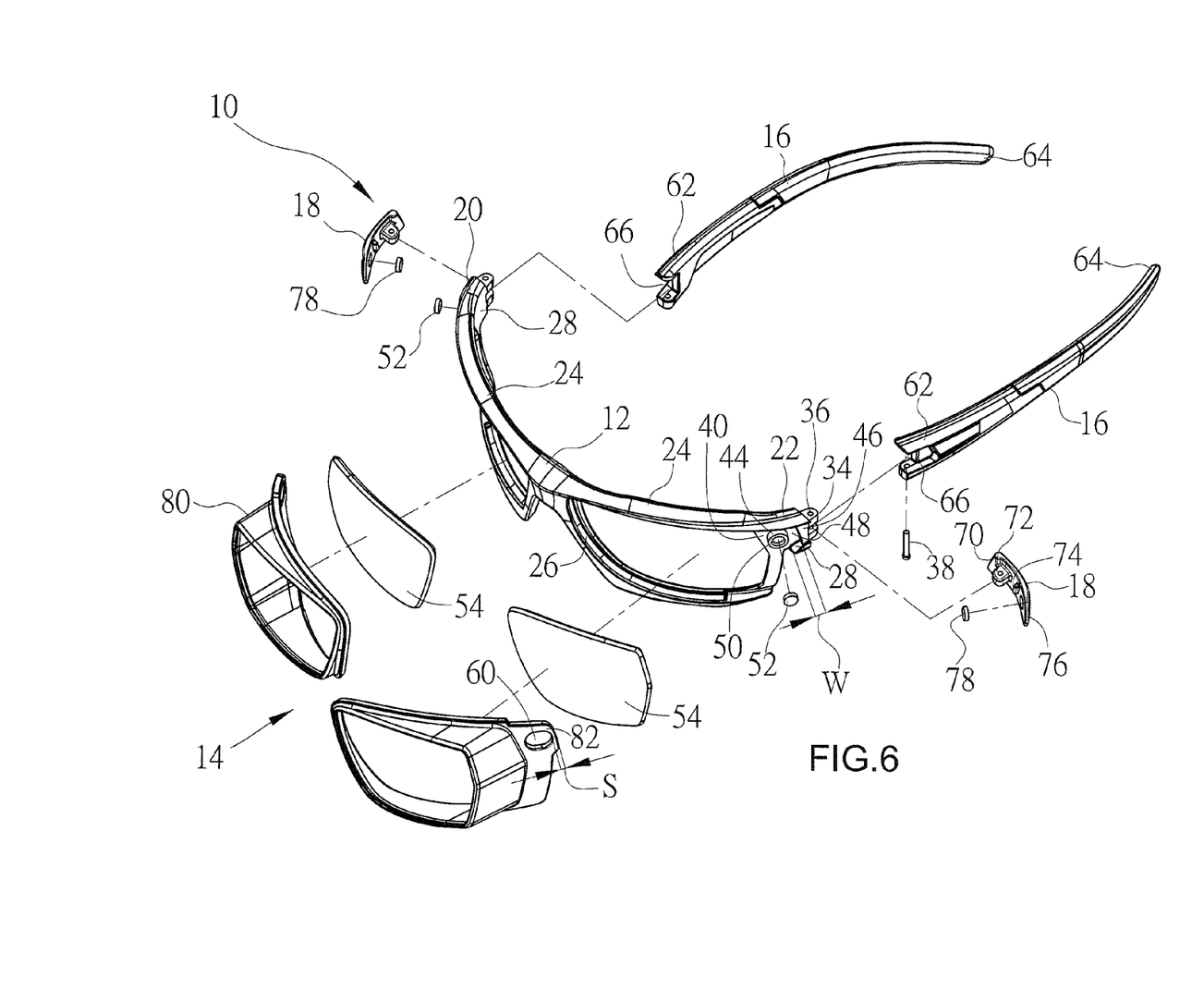
FIG. 6 is an exploded view of a pair of glasses in accordance with a second embodiment of the present invention.
Figure 7:
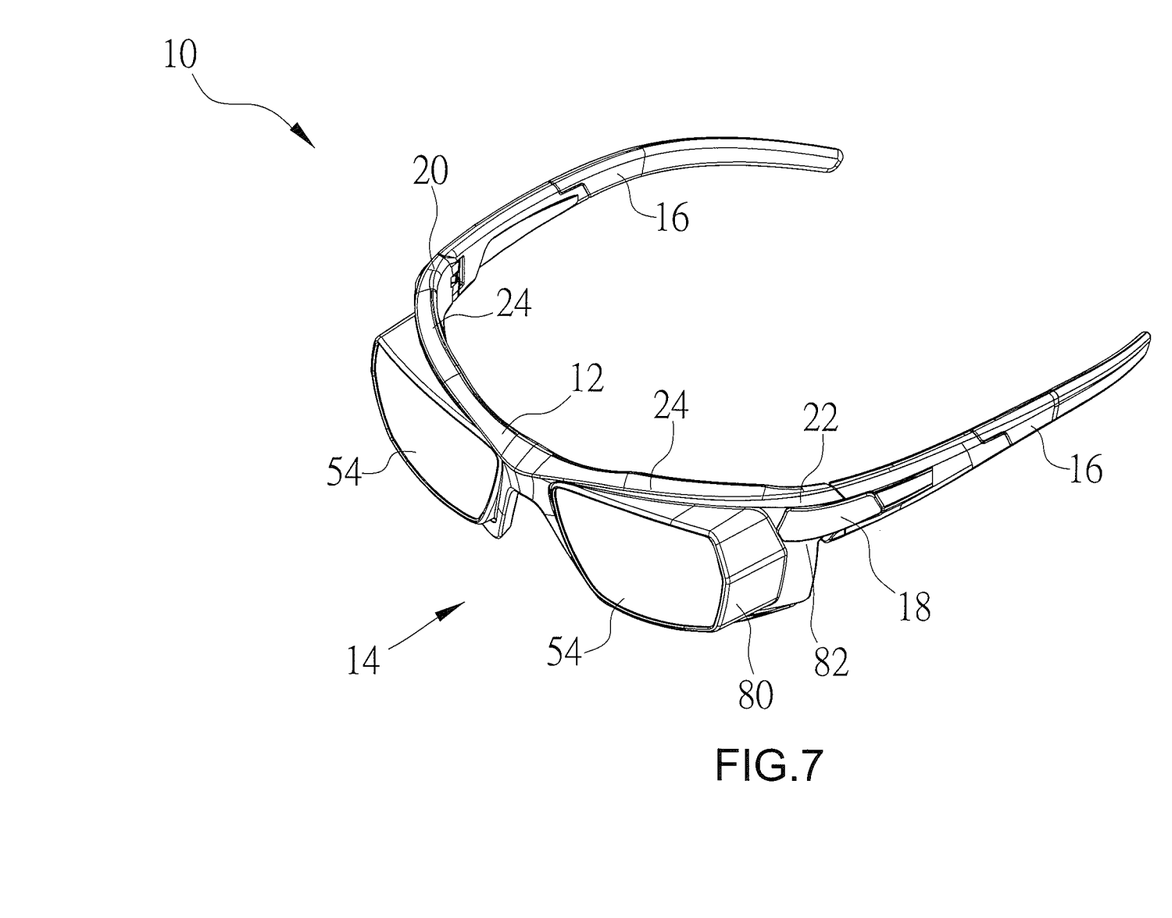
FIG. 7 is a perspective view of the pair of glasses of FIG. 6.
Figure 8:
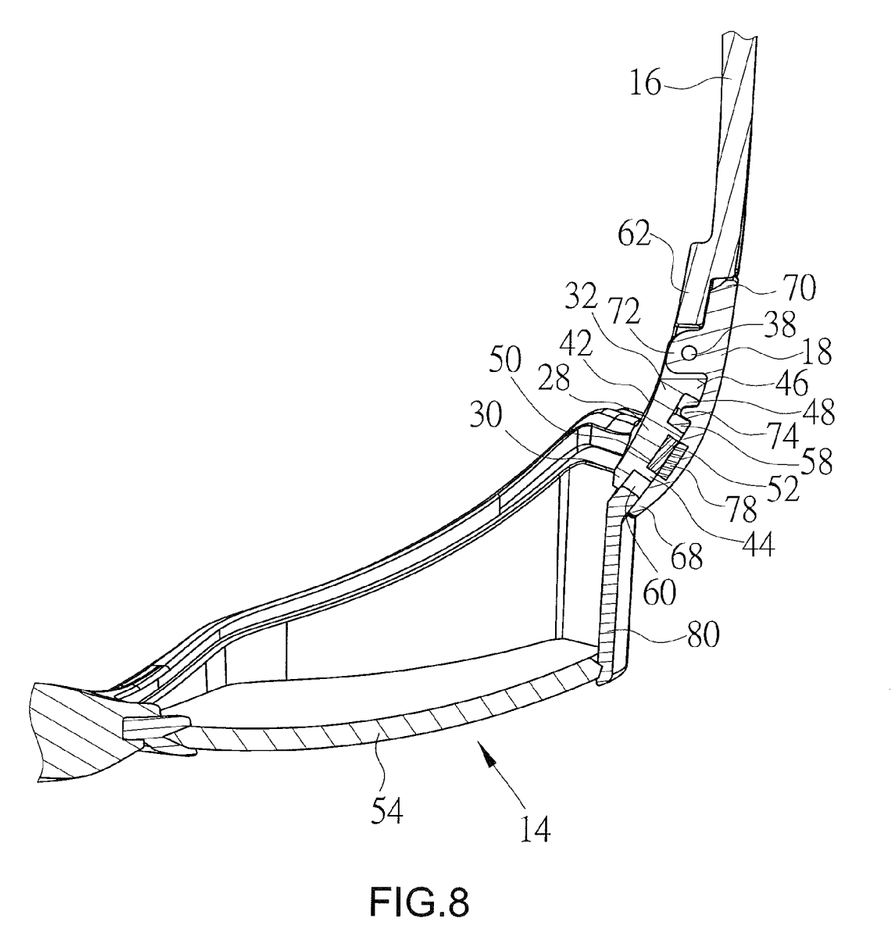
FIG. 8 is a partial, sectional view of the pair of glasses of FIG. 7.

FIGS. 6 through 8 illustrate a pair of glasses 10 in accordance with a second embodiment of the present invention. In this embodiment, the lens unit 14 further includes two frame bodies 80 for installation of two separate lenses 54. The frame bodies 80 are held in the lens-holding grooves 26 and supported by the lens-holding portions 24. Each of the frame bodies 80 has an external side 82 engaged with a corresponding connecting seat 28 and prepared for one of the through-holes 60 of the lens unit 14, so that the through-holes 60 are not provided in the lenses 54. Each of the through-holes 60 of the lens unit 14 is engaged with the bump 44 of a corresponding connecting seat 28 when each of the frame bodies 80 of the lens unit 14 is installed on an associated lens-holding portion 24 of the frame 12 (see FIG. 8). Moreover, the external side 82 of each frame body 80 is located in the engagement space 48 and opposite to and spaced from the projection 46 of the associated connecting seat 28, and the resisting portion 74 of the snap-fit member 18 resists the external side 82 of the corresponding frame body 80 when each snap-fit member 18 is shifted to the fixed position. As such, each lens 54 can be easily removed or secured when the snap-fit member 18 relative to the frame 12 is shifted between the separated position and the fixed position.

Figure 9:
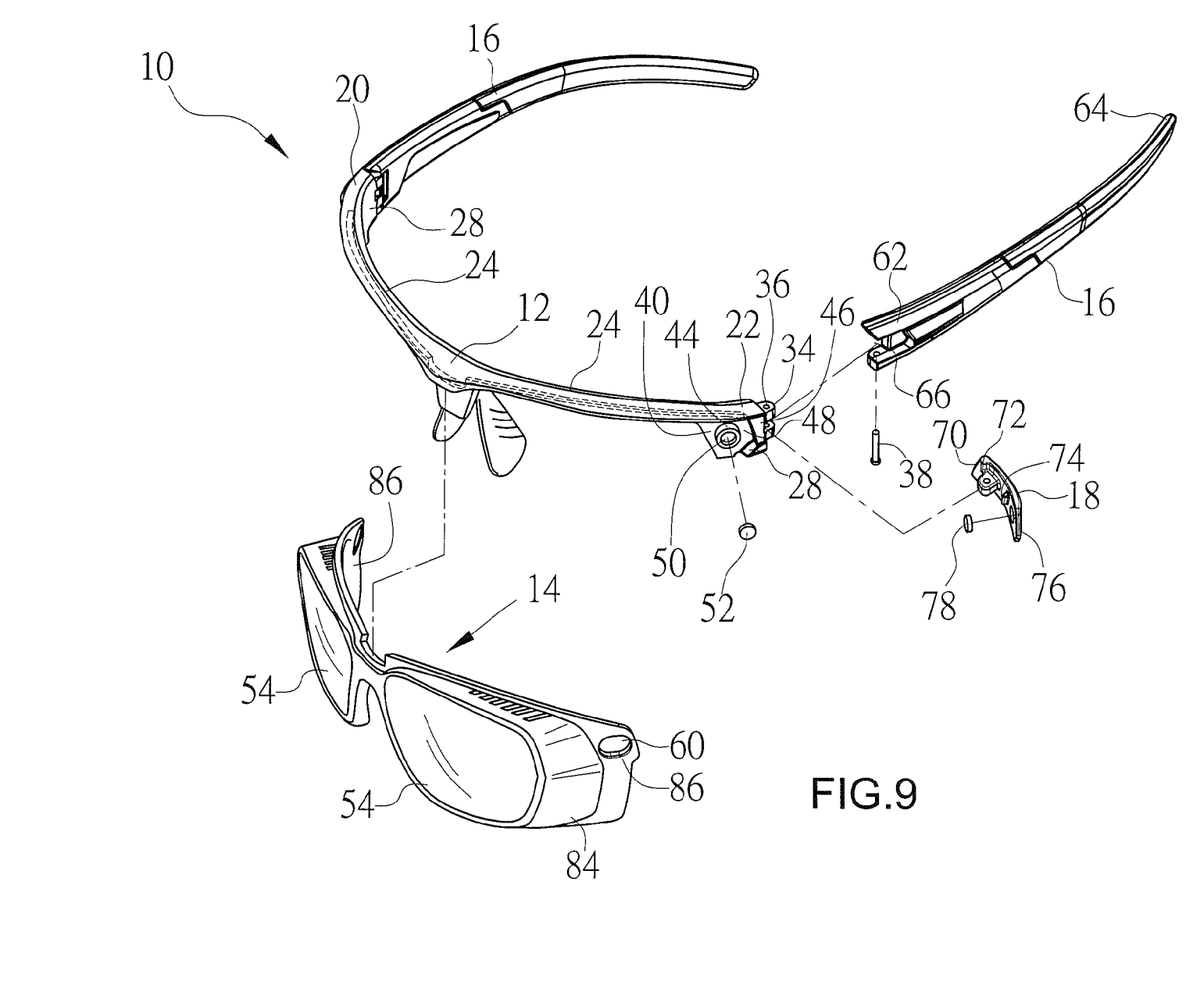
FIG. 9 is an exploded view of a pair of glasses in accordance with a third embodiment of the present invention.

FIG. 9 illustrates a pair of glasses 10 in accordance with a third embodiment of the present invention. In this embodiment, the lens unit 14 includes a single frame body 84 in which two separate lenses 54 are installed. The frame body 84 has two external sides 86 engaged with the two connecting seats 28, and the two through-holes 60 of the lens unit 14 are opened in the external sides 86 of the frame body 84.

Figure 10:
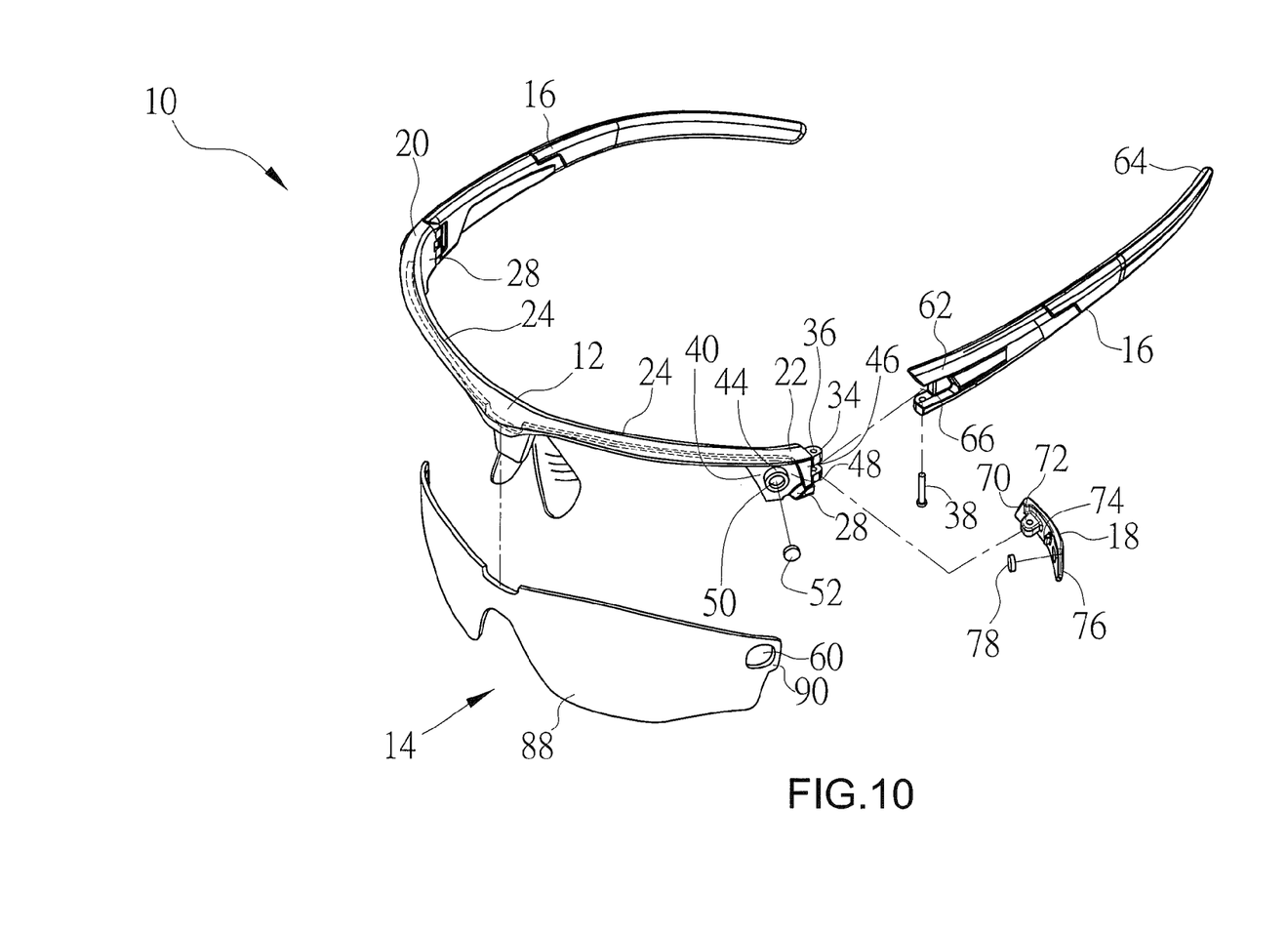
FIG. 10 is an exploded view of a pair of glasses in accordance with a fourth embodiment of the present invention.

FIG. 10 illustrates a pair of glasses 10 in accordance with a fourth embodiment of the present invention. In this embodiment, the lens unit 14 includes a single lens 88 with two external sides 90 engaged with the two connecting seats 28, and each of the two through-holes 60 of the lens unit 14 is opened in one of the external sides 90 of the lens 88.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A pair of glasses, comprising:
   a frame including first and second ends spaced in a longitudinal direction thereof and at least one lens-holding portion between the first and second ends, with a connecting seat formed at each of the first and second ends of the frame and including internal and external ends spaced in the longitudinal direction, with the connecting seat further including an exterior surface formed with a bump and a projection, with the bump being adjacent to the internal end of the connecting seat, with the projection formed on the external end of the connecting seat and spaced from the bump, with an engagement space defined between the bump and the projection;
   a lens unit supported by the lens-holding portion and including two through-holes in which the bumps of the two connecting seats are held;
   two temples each connected with the external end of one of the two connecting seats of the frame; and
   two snap-fit members each including spaced first and second ends, with a pivotal portion provided on the second end of each of the two snap-fit members and pivotally engaged with a corresponding connecting seat of the frame, with each of the two snap-fit members being rotatable relative to the frame between a fixed position and a separated position, with a resisting portion formed on an internal face of each of the two snap-fit members;
   wherein the resisting portion is held in the engagement space to resist an external side and to fix the lens unit in position when each of the two snap-fit members is in the fixed position with the resisting portion aligned with the bump and the pivotal portion; and
   wherein the lens unit is not fixed and the resisting portion is spaced away from the engagement portion when each of the two snap-fit members is in the separated position.

2. The glasses according to claim 1, wherein a first magnet is received in the bump, with a second magnet provided in the first end of each of the two snap-fit members, with the resisting portion of each of the two snap-fit members located between and aligned with the second magnet and the pivotal portion, wherein the second magnet and a corresponding first magnet attract each other to fix the lens unit when each of the two snap-fit members is in the fixed position, and wherein the second magnet keeps away from the corresponding first magnet when each of the two snap-fit members is in the separated position.

3. The glasses according to claim 1, wherein the lens unit includes two lenses, with each of the two lenses including the external side engaged with an associated connecting seat, with each through-hole of the lens unit formed in the external side of one of the two lenses, with the external side of each lens located inside the engagement space and spaced from the projection of the associated connecting seat, with the resisting portion of each of the two snap-fit members resisting the external side of one of the two lenses when each of the two snap-fit members is in the fixed position.

4. The glasses according to claim 1, wherein the lens unit includes two frame bodies and two lenses respectively mounted in the two frame bodies, with each of the two frame bodies including the external side engaged with an associated connecting seat, with each through-hole of the lens unit formed in the external side of one of the two frame bodies, with the external side of each frame body located inside the engagement space and spaced from the projection of the associated connecting seat, with the resisting portion of each of the two snap-fit members resisting the external side of one of the two frame bodies when each of the two snap-fit members is in the fixed position.

5. The glasses according to claim 1, wherein the lens unit includes a frame body and a lens mounted in the frame body, with the frame body including two external sides engaged with the two connecting seats respectively, with each through-hole of the lens unit formed in one of the two external sides of the frame body, with each external side of the frame body located inside the engagement space and spaced from the projection of an associated connecting seat, with the resisting portion of each of the two snap-fit members resisting one of the two external sides of the frame body when each of the two snap-fit members is in the fixed position.

6. The glasses according to claim 1, wherein the lens unit includes a lens, with the lens including two external sides engaged with the two connecting seats respectively, with each through-hole of the lens unit formed in one of the two external sides of the lens, with each external side of the lens located inside the engagement space and spaced from the projection of an associated connecting seat, with the resisting portion of each of the two snap-fit members resisting one of the two external sides of the lens when each of the two snap-fit members is in the fixed position.

* * * * *